United States Patent
Yang et al.

(10) Patent No.: US 9,774,820 B2
(45) Date of Patent: Sep. 26, 2017

(54) DISPLAY SYSTEM, DISPLAY DEVICE, AND HDMI DONGLE

(71) Applicants: HONG FU JIN PRECISION INDUSTRY (ShenZhen) CO., LTD., Shenzhen (CN); HON HAI PRECISION INDUSTRY CO., LTD., New Taipei (TW)

(72) Inventors: Jen-Yu Yang, New Taipei (TW); Wen-Pin Wang, New Taipei (TW); Hui-Hui Chen, New Taipei (TW); Wan-Shih Wang, New Taipei (TW)

(73) Assignees: HONG FU JIN PRECISION INDUSTRY (ShenZhen) CO., LTD., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 15/390,742

(22) Filed: Dec. 27, 2016

(65) Prior Publication Data
US 2017/0111609 A1   Apr. 20, 2017

Related U.S. Application Data

(63) Continuation of application No. PCT/CN2014/081704, filed on Jul. 4, 2014.

(51) Int. Cl.
*H04N 7/01* (2006.01)
*H04N 21/4363* (2011.01)

(52) U.S. Cl.
CPC ..... *H04N 7/0125* (2013.01); *H04N 21/43635* (2013.01)

(58) Field of Classification Search
CPC ........... H04N 7/0125; H04N 21/43635; H04N 5/765; H04N 5/63; H04N 5/4401; H04N 5/44; H04N 5/38; H04N 21/436
(Continued)

(56) References Cited

U.S. PATENT DOCUMENTS

2011/0007041 A1* 1/2011 Huang .................. H04N 5/765
345/204
2016/0066016 A1* 3/2016 Yeh ..................... G06F 13/4068
348/725

FOREIGN PATENT DOCUMENTS

CN    102932682 A    2/2013
CN    202738016 U *  2/2013
(Continued)

*Primary Examiner* — Sherrie Hsia
(74) *Attorney, Agent, or Firm* — Steven Reiss

(57) ABSTRACT

A display system includes a display device and an HDMI dongle electrically connected to the display device. The display device includes a first transmission interface, a first control module, and a power supply module. The HDMI dongle includes a second transmission interface and a second control module. The first and the second transmission interfaces include transmission pins corresponding to each other. The first control module detects voltage of one pin to obtain matching state between the display device and the HDMI dongle and outputs an enabling signal. When the HDMI dongle matches the display device, the enabling signal controls the power supply module to transmit the power supply signal to the second control module through the first and the second transmission interfaces for charging the second control module. When the HDMI dongle does not match the display device, the power supply module is not transmitted to the second control module.

18 Claims, 4 Drawing Sheets

(58) Field of Classification Search
USPC ........ 348/723, 725, 730, 441, 192; 345/204,
345/698, 211; 725/67, 68, 81, 82, 85, 98,
725/100, 118, 131, 139, 151, 148, 150,
725/130
See application file for complete search history.

(56) References Cited

FOREIGN PATENT DOCUMENTS

| | | |
|---|---|---|
| CN | 203027384 U | 6/2013 |
| CN | 203151655 U | 8/2013 |

\* cited by examiner

DISPLAY SYSTEM, DISPLAY DEVICE, AND HDMI DONGLE

FIELD

The subject matter relates to a display device and an HDMI dongle, and more particularly, to a display device comprising a display device and an HDMI dongle.

BACKGROUND

Existing display devices, such as televisions, can match network protocols when the display devices are connected to HDMI dongles through HDMIs. Then, when the display device is controlled by an external device such as a remote controller, a keyboard, or a mouse, the display device can be used to browse web pages or watch online videos. Thereby, the common television is updated to an intelligent television. However, the HDMI dongle and the television have not been integrated by manufactures, and must have their own systems which are independent of each other and their own power supplies. Thus, when the HDMI dongle does not completely match the display device, the HDMI dongle must have its own power cables and adapter. The number and complexity of the cables between the HDMI dongle and the display device is thus increased, and the working stability of the HDMI dongle and the display device is poor.

SUMMARY

A display system which is convenient for connection and has an improved working stability, is presented.

Furthermore, a display device and an HDMI dongle are also disclosed.

A display system comprises a display device and an HDMI dongle, the HDMI dongle is electrically connected to the display device, the display device comprises a first transmission interface, a first adapter circuit, a first control module, and a power supply module;

The first transmission interface comprises a plurality of transmission pins. The plurality of transmission pins comprises a first primary transmission pin and a second primary transmission pin;

The first adapter circuit is electrically connected to and provides voltage to the first primary transmission pin. The voltage of the first primary transmission pin represents a matching state between the HDMI dongle and the display device;

The first control module detects the voltage of the first primary transmission pin to obtain the matching state, and outputs an enabling signal accordingly;

The power supply module is electrically connected to the second primary transmission pin and provides a power supply signal. When the HDMI dongle matches the display device, the enabling signal controls the power supply module to transmit the power supply signal to the second primary transmission pin, thereby supplying power to the HDMI dongle through the second primary transmission pin. When the HDMI dongle does not match the display device, the enabling signal prevents the power supply module from transmitting the power supply signal to the second primary transmission pin;

The HDMI dongle comprises a second transmission interface, a second control module, and a second adapter circuit, the second transmission interface comprises a plurality of transmission pins. The plurality of transmission pins comprises a first secondary transmission pin and a second secondary transmission pin. The secondary transmission pin and the second secondary transmission pin are electrically connected to the first primary transmission pin and the first primary transmission pin, respectively;

The second adapter circuit is electrically connected to the first secondary transmission pin and provides the voltage to the first secondary transmission pin. The second adapter circuit and the first adapter circuit cooperatively identifies the voltage of the first primary transmission pin;

The second control module is electrically connected to the second secondary transmission pin, receives the power supply signal from the second secondary transmission pin, and starts to work under a control of the power supplying signal.

A display device comprises a first HDMI transmission interface, a first control module, and a first adapter circuit;

The first HDMI transmission interface is electrically connected to a display device, and comprises a plurality of transmission pins. The plurality of transmission pins comprises a first primary transmission pin and a second primary transmission pin;

The first adapter circuit is electrically connected to and provides voltage to the first primary transmission pin, the voltage of the first primary transmission pin represents a matching state between the HDMI dongle and the display device;

The first control module detects the voltage of the first primary transmission pin to obtain the matching state, and outputs an enabling signal accordingly;

The power supply module is electrically connected to the second primary transmission pin and provides a power supply signal. When the HDMI dongle matches the display device, the enabling signal controls the power supply module to transmit the power supply signal to the second primary transmission pin. When the HDMI dongle does not match the display device, the enabling signal prevents the power supply module from transmitting the power supply signal to the second primary transmission pin;

An HDMI dongle comprises an HDMI transmission interface, a control module, and an adapter circuit;

The HDMI transmission interface is electrically connected to a display device, and comprises a plurality of transmission pins. The plurality of transmission pins comprises a first secondary transmission pin, a second secondary transmission pin, and a third secondary transmission pin;

The adapter circuit is electrically connected to the first secondary transmission pin and provides the voltage to the first secondary transmission pin, the voltage of the first secondary transmission pin represents a matching state between the HDMI dongle and the display device;

The control module is electrically connected to the second secondary transmission pin and the third secondary transmission pin. When the HDMI dongle matches the display device, the control module receives a power supply signal from the second secondary transmission pin. The power supply signal is configured to supply power to the control module, the control module further receives a first primary control signal from the display device through the third secondary transmission pin, and transmits display data to the display device according to the first primary control signal.

In comparison with the prior art, the display device and the HDMI dongle respectively comprise the first adapter circuit and the second adapter circuit. The first adapter circuit and the second adapter circuit are electrically connected to corresponding pins of the transmission interfaces, thereby cooperatively identifying the voltages of the corresponding pins. The display device determines whether the HDMI dongle matches the display device by detecting the voltage of the corresponding pin. When the HDMI dongle matches the display device, the display device transmits the power supply signal to the HDMI dongle through the transmission interface, thereby supplying power to the HDMI dongle and driving the HDMI dongle to work normally. The display device further transmits the control signal to the HDMI dongle, thereby allowing a precise and convenient connection to the display device.

BRIEF DESCRIPTION OF THE DRAWINGS

Implementations of the present technology will now be described, by way of example only, with reference to the attached figures.

DETAILED DESCRIPTION

Figure 1:
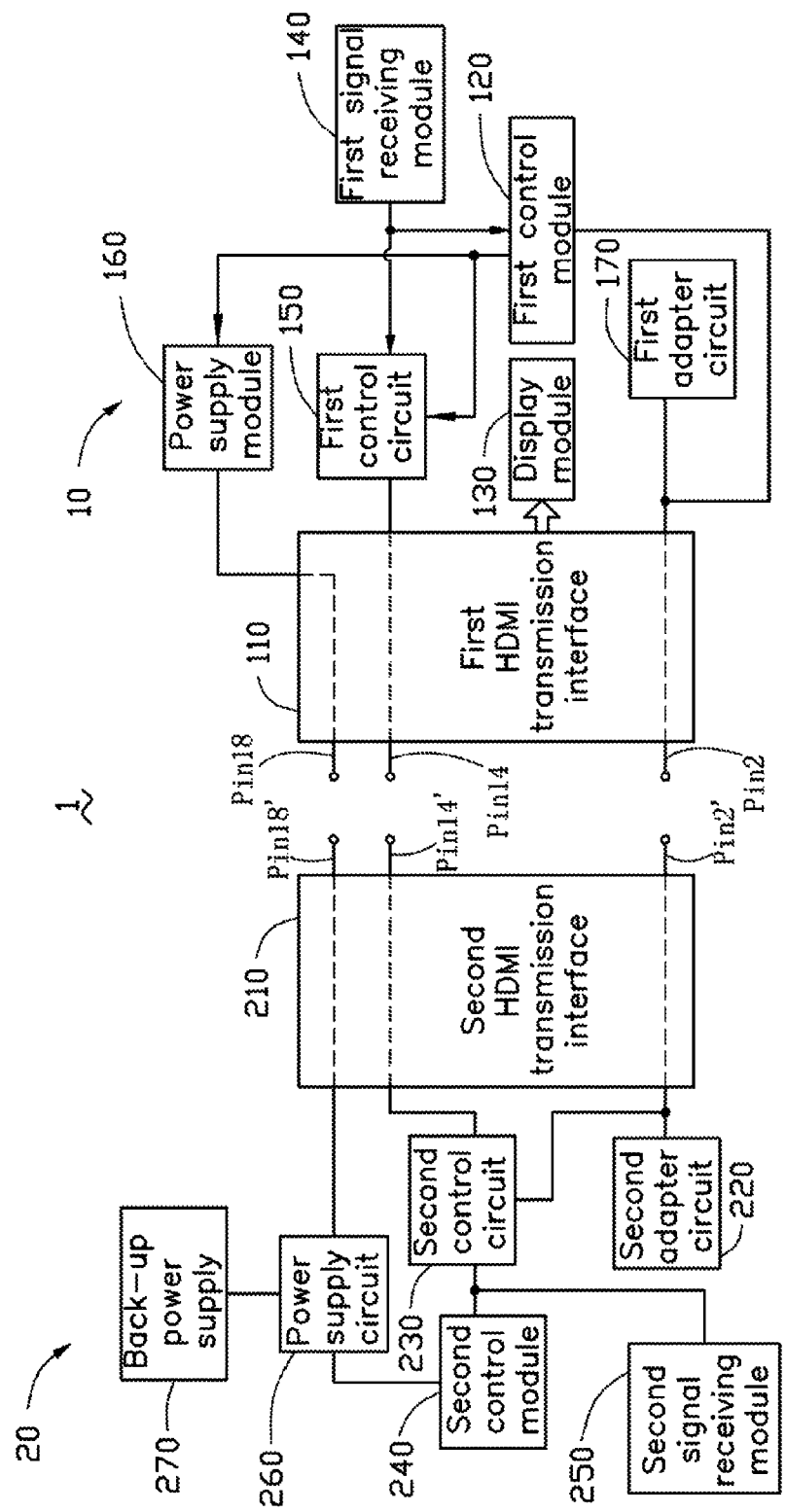
FIG. 1 is a block diagram of an exemplary embodiment of a display system.

It will be appreciated that for simplicity and clarity of illustration, where appropriate, reference numerals have been repeated among the different figures to indicate corresponding or analogous elements. In addition, numerous specific details are set forth in order to provide a thorough understanding of the exemplary embodiments described herein. However, it will be understood by those of ordinary skill in the art that the exemplary embodiments described herein can be practiced without these specific details. In other instances, methods, procedures, and components have not been described in detail so as not to obscure the related relevant feature being described. Also, the description is not to be considered as limiting the scope of the exemplary embodiments described herein. The drawings are not necessarily to scale and the proportions of certain parts may be exaggerated to better illustrate details and features of the present disclosure.

The term "comprising," when utilized, means "including, but not necessarily limited to"; it specifically indicates open-ended inclusion or membership in the so-described combination, group, series, and the like.

FIG. 1 is a block diagram of an exemplary embodiment of a display system. The display system 1 comprises a display device 10 and an HDMI dongle 20. The display device 10 displays images, and can receive control signals from an external remote device and performs corresponding actions according to the control signal. In at least one embodiment, the display device 10 is a television. The HDMI dongle 20 can be controlled by an external control device, such as a remote controller, a mouse, or a keyboard, receives audio and video data from network, decodes the audio and video data, and transmits the audio and video data to the display device 10 for display purpose. When the HDMI dongle 20 is connected to the display device 10, the display device 10 can be used to browse web pages or watch videos under the control of the external control device, thereby making the display device 10 to be more intelligent.

In detail, the display device 10 comprises a first HDMI transmission interface 110, a first control module 120, a display module 130, a first signal receiving module 140, a first control circuit 150, a power supply module 160, and a first adapter circuit 170.

The first HDMI transmission interface 110 comprises a plurality of first HDMI transmission pins or ports. In at least one embodiment, the first HDMI transmission interface 110 is of Specification Version 1.4, and comprises nineteen pins. Pins from the third to the eleventh pins are used to transmit the audio and video data. Pins from the twelfth to the thirteenth pins are connected to a clock circuit (not shown) and receive a clock signal. The eighteenth pin (Pin 18) functions as a power supply pin which is connected to the power supply module 160. The fourteenth pin (Pin 14) is connected to the first control circuit 150 and transmits control signals. The second pin (Pin 2) is defined as a first primary transmission pin. The eighteenth pin (Pin 18) is defined as a second primary transmission pin. The fourteenth pin (Pin 14) is defined as a third primary transmission pin.

The first adapter circuit 170 provides voltage to the second pin (Pin 2). The voltage of the second pin (Pin 2) represents whether the HDMI dongle 20 matches the display device 10. In at least one embodiment, when the second pin (Pin 2) has a first voltage value, the HDMI dongle 20 matches the display device 10. When the second pin (Pin 2) has a second voltage value, the HDMI dongle 20 does not match the display device 10. The first voltage value can be 2.5V, and the second voltage value of the enabling signal can be 0V or 3.3V.

The first control module 120 detects voltage of the second pin (Pin 2) of the first HDMI transmission interface 110, and outputs an enabling signal according to the detected voltage to the power supply module 160 and the first control circuit 150. The first control module 120 further receives a first control signal from the first signal receiving module 140. In detail, when the HDMI dongle 20 matches the display device 10, the first control module 120 outputs an enabling signal having a third voltage value. When the HDMI dongle 20 does not match the display device 10, the first control module 120 outputs an enabling signal having a fourth voltage value. In at least one embodiment, the third voltage value of the enabling signal can be 0V, and the fourth voltage value of the enabling signal can be 3.3V.

The display module 130 receives display data comprising the audio and video data and displays images. In at least one embodiment, the display module 130 is a liquid crystal display module.

The first signal receiving module 140 receives the first control signal from an external device (not shown), decodes the first control signal to a first primary control signal, and outputs the first primary control signal.

The first control circuit 150 receives the enabling signal from the first control module 120, and selectively transmits the first primary control signal from the first signal receiving module 140 to the fourteenth pin (Pin 14) of the first HDMI transmission interface 110 under the control of the enabling signal. In detail, when the enabling signal has the third voltage value, the first control circuit 150 is in an ON-state and transmits the first primary control signal to the fourteenth pin (Pin 14). When the enabling signal has the fourth voltage value, the first control circuit 150 is in an OFF-state and does not transmit the first primary control signal to the fourteenth pin (Pin 14) of the first HDMI transmission interface 110.

The power supply module 160 is electrically connected to the eighteenth pin (Pin 18) of the first HDMI transmission interface 110 and provides a power supply signal. The power supply module 160 selectively transmits the power supply signal to the eighteenth pin (Pin 18) under the control of the enabling signal, thereby supplying power to and charging the HDMI dongle 20. In detail, when the enabling signal has the third voltage value, the power supply module 160 transmits the power supply signal to the eighteenth pin (Pin 18). When the enabling signal has the fourth voltage value, the power supply module 160 does not transmit the power supply signal to the eighteenth pin (Pin 18) of the first HDMI transmission interface 110.

The HDMI dongle 20 comprises a second HDMI transmission interface 210, a second adapter circuit 220, a second control circuit 230, a second control module 240, a second signal receiving module 250, a power supply circuit 260, and a back-up power supply 270.

The second HDMI transmission interface 210 also comprises a plurality of transmission pins or ports which correspond, pin-to-pin, to the pins of the first HDMI transmission interface 110. The second HDMI transmission interface 210 transmits the display data comprising the audio and video data to the first HDMI transmission interface 110. In detail, the second pin (Pin 2') of the second HDMI transmission interface 210 corresponds to the second pin (Pin 2) of the first HDMI transmission interface 110. The fourteenth pin (Pin 14') of the second HDMI transmission interface 210 corresponds to the fourteenth pin (Pin 14) of the first HDMI transmission interface 110. The eighteenth pin (Pin 18') of the second HDMI transmission interface 210 corresponds to the eighteenth pin (Pin 18) of the first HDMI transmission interface 110. For simplicity, the second pin (Pin 2') of the second HDMI transmission interface 210 is defined as a first secondary transmission pin. The eighteenth pin (Pin 18') of the second HDMI transmission interface 210 is defined as a second secondary transmission pin. The fourteenth pin (Pin 14') of the second HDMI transmission interface 210 is defined as a third secondary transmission pin.

The second pin (Pin 2') of the second HDMI transmission interface 210 is electrically connected to the second adapter circuit 220 to obtain the corresponding voltage. The eighteenth pin (Pin 18') of the second HDMI transmission interface 210 receives the power supply signal from the eighteenth pin (Pin 18) of the first HDMI transmission interface 110, and transmits the power supply signal to the second control module 240 to drive the second control module 240 to work normally. The fourteenth pin (Pin 14') of the second HDMI transmission interface 210 receives the first primary control signal from the fourteenth pin (Pin 14) of the first HDMI transmission interface 110.

The second adapter circuit 220 provides the voltage to the second pin (Pin 2') of the second HDMI transmission interface 210. The second adapter circuit 220 and the first adapter circuit 170 cooperatively identify the voltages of the second pin (Pin 2') and the second pin (Pin 2).

The second control circuit 230 is electrically connected between the fourteenth pin (Pin 14') and the second control module 240. The second control circuit 230 is further electrically connected to the second pin (Pin 2') of the second HDMI transmission interface 210. The second control circuit 230 receives a setting signal from the second pin (Pin 2'), and selectively transmits the first primary control signal from the fourteenth pin (Pin 14') to the second control module 240 according to the setting signal. In at least one embodiment, the voltage of the second pin (Pin 2') functions as the setting signal. In detail, when the setting signal has the first voltage value, the second control circuit 230 controls the fourteenth pin (Pin 14') to electrically connect to the second control module 240. When the setting signal has the second voltage value, the second control circuit 230 controls the fourteenth pin (Pin 14') to electrically disconnect from the second control module 240.

The second signal receiving module 250 receives a second control signal from the external control device, decodes the second control signal to a second secondary control signal, and transmits the second secondary control signal to the second control module 240.

The second control module 240 performs control and operation functions according to the first primary control signal from the fourteenth pin (Pin 14') or the second secondary control signal from the second signal receiving module 250, and transmits the audio and video data to the display module 130 of the display device 10 through the second HDMI transmission interface 210 and the first HDMI transmission interface 110.

The power supply circuit 260 receives the power supply signal, regulates the power supply signal by a DC-DC conversion process, and transmits the power supply signal to the second control module 240 to supply power to the second control module 240.

The back-up power supply 270 supplies power to each module of the HDMI dongle 20 when the eighteenth pin (Pin 18') of the second HDMI transmission interface 210 does not receive the power supply signal.

Figure 2:
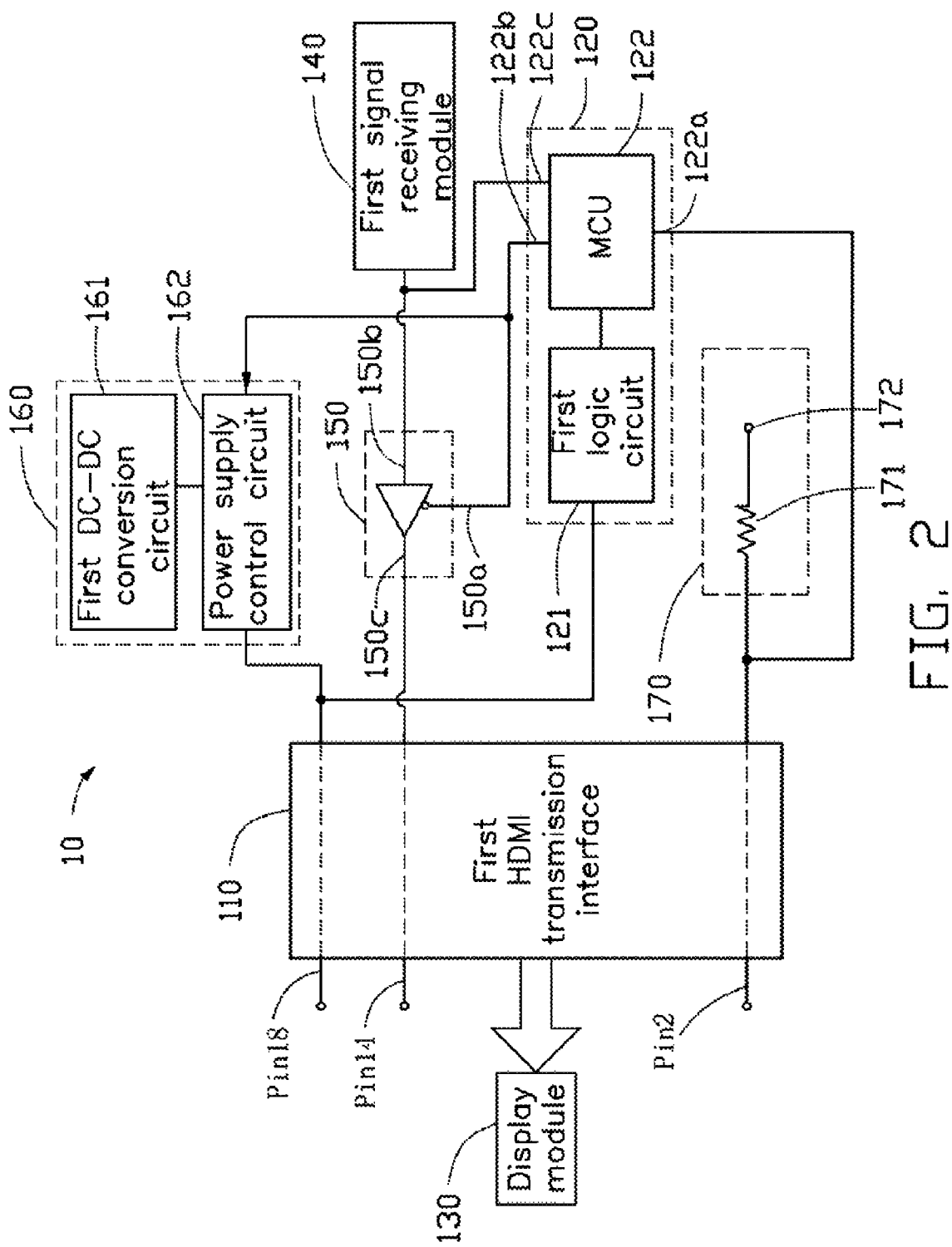
FIG. 2 is a circuit diagram of a display device included in the display system of FIG. 1.

FIG. 2 illustrates a circuit diagram of an exemplary embodiment of the display device 10. The power supply module 160 comprises a first DC-DC conversion circuit 161 and a power supply control circuit 162. The first DC-DC conversion circuit 161 outputs the power supply signal. In at least one embodiment, the power supply signal has a voltage value of 5V and an electrical current value of 2 A.

The power supply control circuit 162 is electrically connected to the first DC-DC conversion circuit 161 and the eighteenth pin (Pin 18) of the first HDMI transmission interface 110. The power supply control circuit 162 can be switched between an ON-state and an OFF-state under the control of the enabling signal, selectively connects or disconnects the first DC-DC conversion circuit 161 to or from the eighteenth pin (Pin 18), and selectively outputs the power supply signal to the eighteenth pin (Pin 18). In detail, when the enabling signal has the third voltage value, the power supply control circuit 162 is in the ON-state and controls the first DC-DC conversion circuit 161 to electrically connect to the eighteenth pin (Pin 18). When the enabling signal has the fourth voltage value, the power supply control circuit 162 is in the OFF-state, causing the first DC-DC conversion circuit 161 to electrically disconnect to the eighteenth pin (Pin 18). In at least one embodiment, the power supply control circuit 162 is a transistor.

The first control module 120 comprises a first logic circuit 121 and a micro controller unit (MCU) 122. The first logic circuit 121 is electrically connected to the eighteenth pin (Pin 18) and the MCU 122, and provides a clock signal and a buffering signal to the MCU 122. The first logic circuit 121 further detects the voltage of the eighteenth pin (Pin 18) and outputs a detecting signal to the MCU 122 accordingly.

The MCU 122 comprises a detecting port 122a, an enabling signal output port 122b, and a signal input port 122c. The detecting port 122a is electrically connected to the second pin (Pin 2) and detects the voltage of the second pin (Pin 2). When the second pin (Pin 2) has the first voltage value, the HDMI dongle 20 matches the display device 10, and the MCU 122 outputs the enabling signal having the third voltage value. When the second pin (Pin 2) has the second voltage value, the HDMI dongle 20 does not match the display device 10, and the MCU 122 outputs the enabling signal having the fourth voltage value. Furthermore, when the HDMI dongle 20 does not match the display device 10, the eighteenth pin (Pin 18) performs a hot-plug detection, that is, the eighteenth pin (Pin 18) detects a connecting state of the first HDMI transmission interface 110. For example, when the external device is plugged into the first HDMI transmission interface 110, the eighteenth pin (Pin 18) outputs a voltage of 5V to the first logic circuit 121. When no external device is plugged into the first HDMI transmission interface 110, the eighteenth pin (Pin 18) floats, and the first logic circuit 121 detects the voltage of the eighteenth pin (Pin 18) and outputs a detecting signal to the MCU 122 accordingly, thereby informing the MCU 122 whether the external device is plugged into the first HDMI transmission interface 110.

The enabling signal output port 122*b* is electrically connected to the first control circuit 150 and the power supply control circuit 162, and outputs the enabling signal to the first control circuit 150 and the power supply control circuit 162. The signal input port 122*c* is electrically connected to the first signal receiving module 140, and receives the first primary control signal from the first signal receiving module 140.

The first control circuit 150 comprises a first enabling port 150*a*, a first transmission port 150*b*, and a second transmission port 150*c*. The first enabling port 150*a* is electrically connected to the enabling signal output port 122*b* of the MCU 122 and receives the enabling signal. The first transmission port 150*b* is electrically connected to the first signal receiving module 140. The second transmission port 150*c* is electrically connected to the fourteenth pin (Pin 14). The first control circuit 150 can be switched between an ON-state and an OFF-state under the control of the enabling signal. That is, when the enabling signal has the third voltage value, the first control circuit 150 is in ON-state. When the enabling signal has the fourth voltage value, the first control circuit 150 is in OFF-state. When the first control circuit 150 is in ON-state, the first transmission port 150*b* is electrically connected to and the second transmission port 150*c*, thereby allowing the first primary control signal to be transmitted the fourteenth pin (Pin 14). When the first control circuit 150 is in OFF-state, the first signal receiving module 140 does not transmit the first primary control signal to the fourteenth pin (Pin 14).

In at least one embodiment, the first control circuit 150 is a signal control switch, for example, the first control circuit 150 can be a transistor or a field effect transistor. A control port of the first control circuit 150, such as a gate, functions as the first enabling port 150*a*. A signal input port of the first control circuit 150, such as a source, functions as the first transmission port 150*b*. A signal output port of the first control circuit 150, such as a drain, functions as the second transmission port 150*c*.

The first control circuit 150 can prevent other control signals of the first control module 120 from being mistakenly transmitted to the HDMI dongle 20 or other devices.

The first adapter circuit 170 comprises a first resistance 171 and a first voltage port 172. An end of the first resistance 171 is connected to the first voltage port 172. An opposite end of the first resistance 171 is connected to the second pin (Pin 2). The first voltage port 172 can have a fifth voltage value of 3V.

The first signal receiving module 140 receives the first control signal from an external device independent of the display device 10, and decodes the first control signal. In at least one embodiment, the external device is an infrared remote controller. The first signal receiving module 140 is an infrared signal receiving module which can decode the first control signal in an infrared form from the infrared remote controller.

Figure 3:
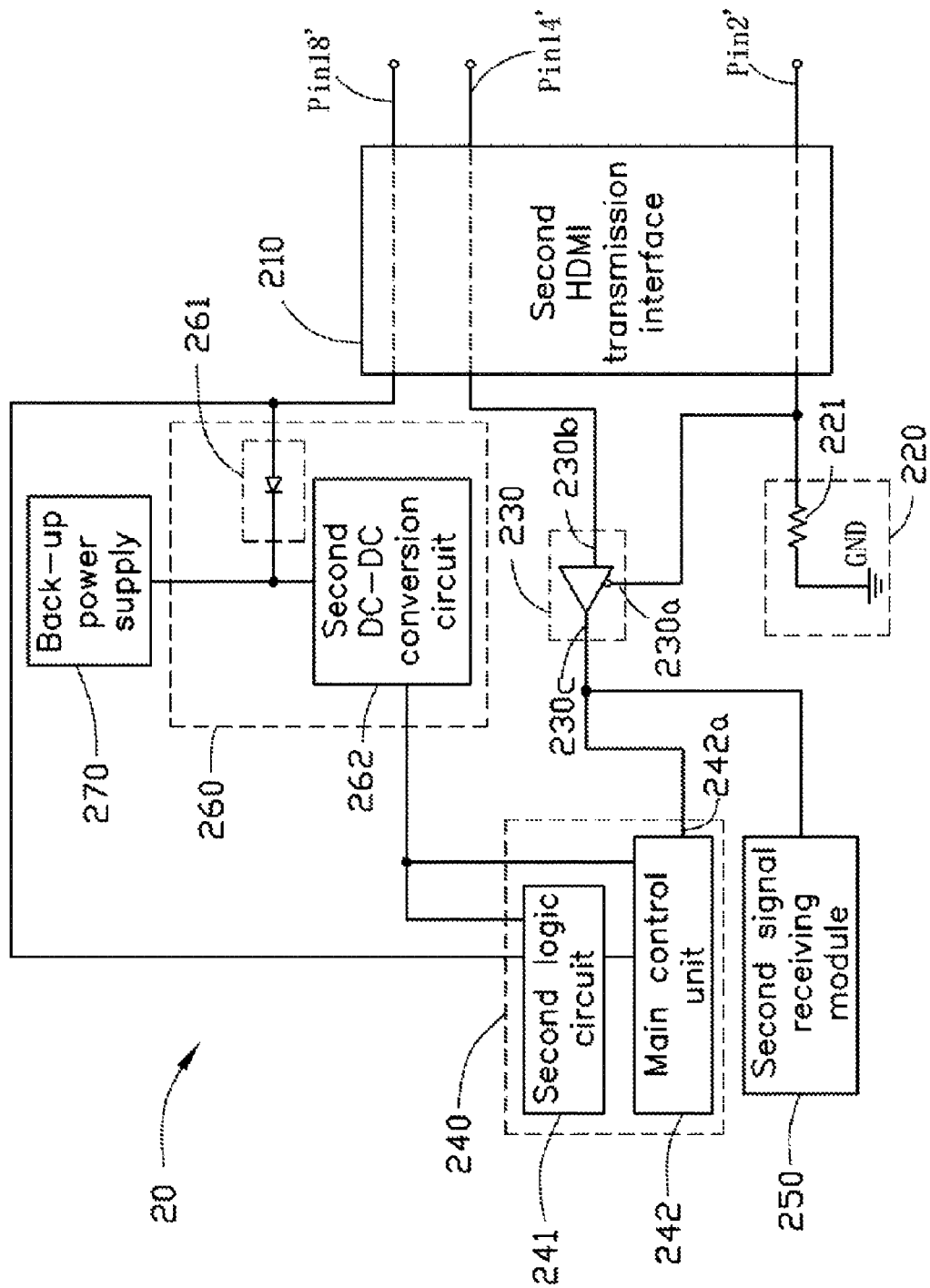
FIG. 3 is circuit diagram of an HDMI dongle included in the display system of FIG. 1.

FIG. 3 illustrates a circuit diagram of the HDMI dongle 20. The second adapter circuit 220 comprises a second resistance 221. An end of the second resistance 221 is connected to ground (GND). An opposite end of the second resistance 221 is connected to the second pin (Pin 2').

The second control circuit 230 comprises a second enabling port 230*a*, a third transmission port 230*b*, and a fourth transmission port 230*c*. The second enabling port 230*a* is electrically connected to the second pin (Pin 2'). The third transmission port 230*b* is electrically connected to the fourteenth pin (Pin 14'). The fourth transmission port 230*c* is electrically connected to the second control module 240. The second control circuit 230 can be switched between an ON-state and an OFF-state under the control of the setting signal. That is, when the setting signal has the first voltage value, the second control circuit 230 is in ON-state. When the setting signal has the second voltage value, the second control circuit 230 is in OFF-state. When the second control circuit 230 is in ON-state, the third transmission port 230*b* is electrically connected to the fourth transmission port 230*c*, thereby allowing the first primary control signal from the fourteenth pin (Pin 14') to be transmitted to the second control module 240. When the second control circuit 230 is in OFF-state, the second control circuit 230 does not transmit the first primary control signal to the second control module 240.

In at least one embodiment, the second control circuit 230 is also a signal control switch, for example, the first control circuit 150 can be a transistor or a field effect transistor. A control port of the second control circuit 230, such as a gate, functions as the second enabling port 230*a*. A signal input port of the second control circuit 230, such as a source, functions as the third transmission port 230*b*. A signal output port of the second control circuit 230, such as a drain, functions as the fourth transmission port 230*c*.

When the HDMI dongle 20 does not match the display device 10, the second control circuit 230 can prevent abnormal signals from being transmitted to the second control module 240 of the HDMI dongle 20 which may cause incorrect operations of the HDMI dongle 20. Furthermore, the second control circuit 230 can prevent abnormal signals of the HDMI dongle 20 or other devices from being transmitted to the display device 10 which may cause incorrect operations of the display device 10.

The second control module 240 comprises a second logic circuit 241 and a main control unit 242. The second logic circuit 241 is electrically connected to the main control unit 242 and functions as an auxiliary circuit of the main control unit 242. In addition, when the HDMI dongle 20 does not match the display device 10, the eighteenth pin (Pin 18') performs a hot-plug detection, that is, the eighteenth pin (Pin 18') detects a connecting state of the second HDMI transmission interface 210. For example, when the HDMI dongle 20 does not match the display device 10, the second HDMI transmission interface 210 functions as a common signal transmission interface. When the second HDMI transmission interface 210 is plugged into another display device, the second logic circuit 241 outputs a voltage of 5V to the eighteenth pin (Pin 18'), thereby informing the display device that the HDMI dongle 20 has been plugged in. When the second HDMI transmission interface 210 is not plugged into another display device, the second logic circuit 241 controls the eighteenth pin (Pin 18') to float.

The main control unit 242 comprises a signal receiving port 242*a*. The signal receiving port 242*a* is electrically connected to the fourth transmission port 230*c* of the second control circuit 230 and the second signal receiving module 250. The main control unit 242 receives the first primary control signal, performs corresponding actions (for example, control and operating functions) according the first primary control signal, and outputs the audio and video data through the second HDMI transmission interface 210. In addition, the main control unit 242 can also receive control signals from the second signal receiving module 250.

The second signal receiving module 250 can also receive the second control signal from the external control device, decodes the second control signal to a second secondary control signal, and transmits the second secondary control signal to the main control unit 242. In at least one embodiment, the second signal receiving module 250 is a radio-frequency signal receiving module which can receive a control signal having a band ratio of 2.4 GHz.

The power supply circuit 260 is electrically connected between the eighteenth pin (Pin 18') and the second control module 240. The power supply circuit 260 regulates the power supply signal by a DC-DC conversion process, and transmits the power supply signal to the second control module 240 to supply power to the second control module 240, thereby driving the second control module 240 to work normally.

The power supply circuit 260 comprises a protection element 261 and a second DC-DC conversion circuit 262. The protection element 261 is electrically connected between the eighteenth pin (Pin 18') and the second DC-DC conversion circuit 262. The protection element 261 transmits the power supply signal to the second DC-DC conversion circuit 262, and further prevents voltage or current from the second DC-DC conversion circuit 262 from being transmitted in reverse to the eighteenth pin (Pin 18'). In at least one embodiment, the protection element 261 is a diode. An anode of the diode is electrically connected to the eighteenth pin (Pin 18'). A cathode of the diode is electrically connected to the second DC-DC conversion circuit 262. The second DC-DC conversion circuit 262 converts the power supply signal and provides the converted power supply signal to the second control module 240.

The back-up power supply 270 has a USB transmission interface. When the HDMI dongle 20 does not match the display device 10, the back-up power supply 270 can receive a power supply signal from an external power source and charge the second control module 240.

In comparison with prior art, the display device 10 and the HDMI dongle 20 respectively comprise the first adapter circuit 170 and the second adapter circuit 220. The first adapter circuit 170 and the second adapter circuit 220 are electrically connected to corresponding pins of the transmission interface, thereby cooperatively identifying the voltages of the corresponding pins. The display device 10 determines whether the HDMI dongle 20 matches the display device 10 by detecting the voltage of the corresponding pin. When the HDMI dongle 20 matches the display device 10, the display device 10 transmits the power supply signal to the HDMI dongle 20, thereby driving the HDMI dongle 20 to work normally. When the HDMI dongle 20 does not match the display device 10, the first HDMI transmission interface 110 of the display device 10 functions as a common HDMI which is used to connect to other types of HDMI devices.

Furthermore, when the HDMI dongle 20 matches the display device 10, the display device 10 transmits the first primary control signal to the HDMI dongle 20, thereby allowing the HDMI dongle 20 to perform functional operations cooperatively with the display device 10. Convenience in operating the display device 10 and the HDMI dongle 20 is improved.

Figure 4:
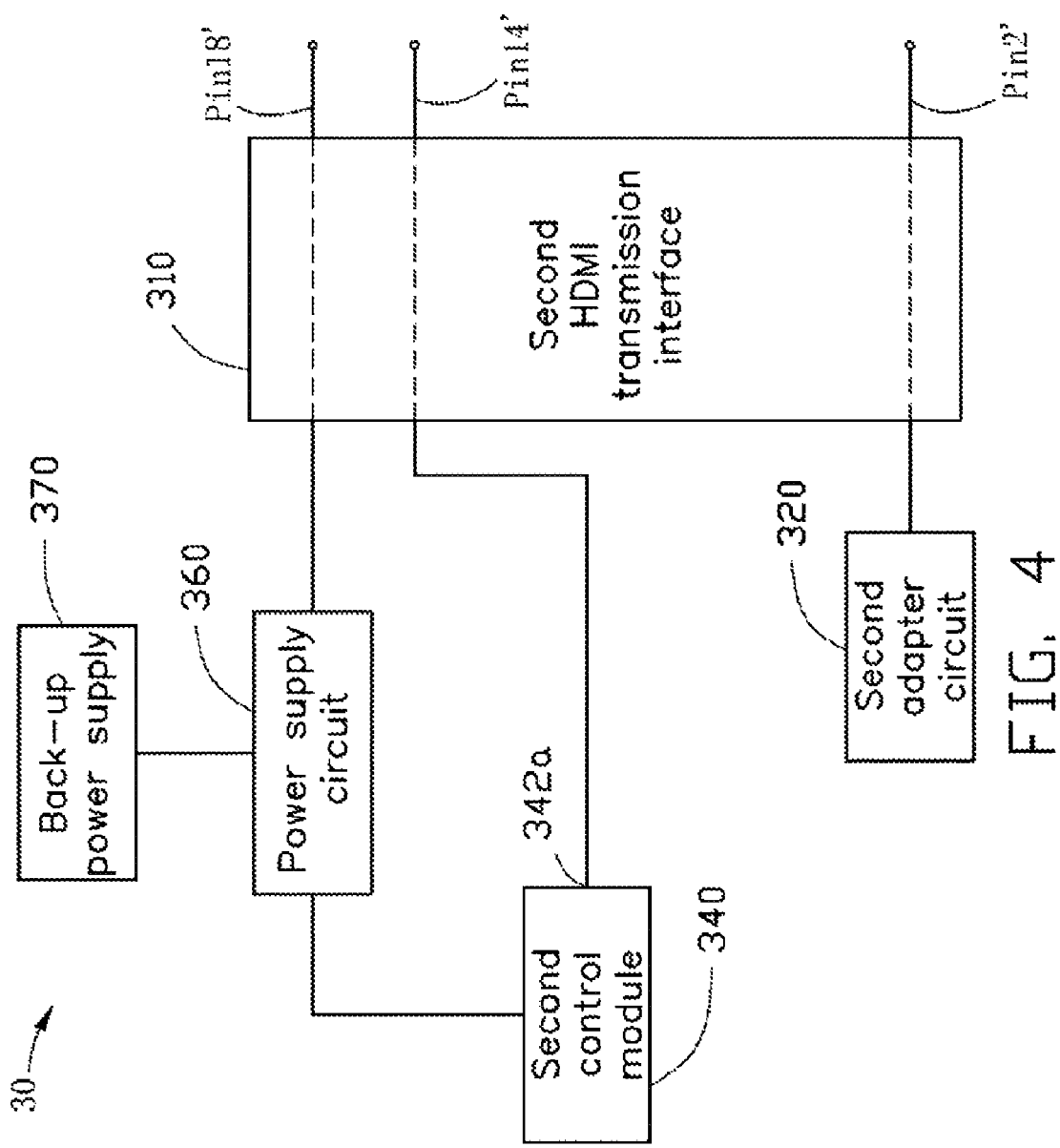
FIG. 4 is a block diagram of another exemplary embodiment of an HDMI dongle.

FIG. 4 illustrates a block diagram of another exemplary embodiment of an HDMI dongle. The HDMI dongle 30 has a similar structure as the HDMI dongle 20. The difference is that the HDMI dongle 30 does not comprise the second control circuit 230 and the second signal receiving module 250. That is, the HDMI dongle 30 only comprises a second HDMI transmission interface 310, a second adapter circuit 320, a second control module 340, a power supply circuit 360, and a back-up power supply 370. The fourteenth pin (Pin 14') is directly and electrically connected to a signal receiving port 342a of the second control module 340.

In detail, since the fourteenth pin (Pin 14') of the second HDMI transmission interface 310 is directly and electrically connected to the signal receiving port 342a of the second control module 340, when the HDMI dongle 20 matches the display device 10, the fourteenth pin (Pin 14') directly transmits the first primary control signal to the second control module 340, thereby causing the second control module 340 to perform corresponding actions, for example, to selectively transmit the audio and video data to the display device 10, according to the first primary control signal.

It is to be understood, even though information and advantages of the present embodiments have been set forth in the foregoing description, together with details of the structures and functions of the present embodiments, the disclosure is illustrative only; changes may be made in detail, especially in matters of shape, size, and arrangement of parts within the principles of the present embodiments to the full extent indicated by the plain meaning of the terms in which the appended claims are expressed.

What is claimed is:

1. A display system comprising:
   a display device comprising a first transmission interface, a first adapter circuit, a first control module, and a power supply module; and
   an HDMI dongle, the HDMI dongle electrically connected to the display device, and comprising a second transmission interface, a second control module, and a second adapter circuit;
   wherein the first transmission interface comprises a plurality of transmission pins, the plurality of transmission pins comprises a first primary transmission pin and a second primary transmission pin;
   the first adapter circuit is electrically connected to and provides voltage to the first primary transmission pin, the voltage of the first primary transmission pin represents a matching state between the HDMI dongle and the display device;
   the first control module detects the voltage of the first primary transmission pin to obtain the matching state, and outputs an enabling signal accordingly;
   the power supply module is electrically connected to the second primary transmission pin and provides a power supply signal, when the HDMI dongle matches the display device, the enabling signal controls the power supply module to transmit the power supply signal to the second primary transmission pin, thereby supplying power to the HDMI dongle through the second primary transmission pin; when the HDMI dongle does not match the display device, the enabling signal prevents the power supply module from transmitting the power supply signal to the second primary transmission pin;
   wherein the second transmission interface comprises a plurality of transmission pins, the plurality of transmission pins comprises a first secondary transmission pin and a second secondary transmission pin, the first transmission pin and the second secondary transmission pin are electrically connected to the first primary transmission pin and the first primary transmission pin, respectively;

the second adapter circuit is electrically connected to the first secondary transmission pin and provides the voltage to the first secondary transmission pin, the second adapter circuit and the first adapter circuit cooperatively identifies the voltage of the first primary transmission pin;

the second control module is electrically connected to the second secondary transmission pin, receives the power supply signal from the second secondary transmission pin, and starts to work under a control of the power supplying signal;

wherein the first adapter circuit and the second adapter circuit cooperatively cause the first primary transmission pin to have a first voltage value or a second voltage value, the first primary transmission pin has the first voltage value when the HDMI dongle matches the display device, and the first primary transmission pin has the second voltage value when the HDMI dongle does not match the display device; the enabling signal has a third voltage value when the HDMI dongle matches the display device, and has a fourth voltage value when the HDMI dongle does not match the display device.

2. The display system of claim 1, wherein the power supply module comprises a first DC-DC conversion circuit and a power supply control circuit, the first DC-DC conversion circuit outputs the power supply signal, the power supply control circuit is electrically connected to the first DC-DC conversion circuit and the second primary transmission pin, the power supply control circuit selectively connect or disconnect the first DC-DC conversion circuit to the second primary transmission pin under a control of the enabling signal, when the HDMI dongle matches the display device, the power supply control circuit controls the first DC-DC conversion circuit to electrically connect to the second primary transmission pin, thereby allowing the power supply signal to be transmitted to the second primary transmission pin, when the HDMI dongle does not match the display device, the power supply control circuit controls the first DC-DC conversion circuit to electrically disconnect from the second primary transmission pin, and does not transmit the power supply signal to the second primary transmission pin.

3. The display system of claim 1, wherein the display device further comprises a first control circuit and a first signal receiving module, the first transmission interface further comprises a third primary transmission pin, the first signal receiving module is electrically connected to the first control circuit and the first control module, receives a first control signal from an external device, converts the first control signal to a first primary control signal which is configured to control the display device and the HDMI dongle to work, the first control circuit is electrically connected to the second primary transmission pin and the first control module and is controlled by the enabling signal, when the HDMI dongle matches the display device, the first control circuit transmits the first primary control signal to the third primary transmission pin, when the HDMI dongle does not match the display device, the first control circuit does not transmit the first primary control signal to the third primary transmission pin, the second transmission interface further comprises a third secondary transmission pin, the third secondary transmission pin is electrically connected to the third primary transmission pin, the second control module receives the first primary control signal from the third secondary transmission pin, and transmits display data to the display device according to the first primary control signal.

4. The display system of claim 3, wherein the first control circuit comprises a first enabling port, a first transmission port, and a second transmission port, the first enabling port receives the enabling signal, the first transmission port is electrically connected to the first signal receiving module, the second transmission port is electrically connected to the third primary transmission pin, when the HDMI dongle matches the display device, the first control circuit is in an ON-state which causes first transmission port to electrically connect to and the second transmission port, when the HDMI dongle does not match the display device, the first control circuit is in an OFF-state which causes first transmission port to be electrically disconnected from the second transmission port.

5. The display system of claim 3, wherein the HDMI dongle further comprises a second control circuit, the second control circuit is electrically connected between the third secondary transmission pin and the second control module, and is further electrically connected to the first secondary transmission pin, a voltage of the first secondary transmission pin function as a setting signal which is transmitted to the second control circuit, the second control circuit selectively controls the third secondary transmission pin to electrically connect to or disconnect from the second control module according to the setting signal; the second control circuit comprises a second enabling port, a third transmission port, and a fourth transmission port, the second enabling port is electrically connected to the first secondary transmission pin, the third transmission port is electrically connected to the third secondary transmission pin, the fourth transmission port is electrically connected to the second control module; when the setting signal has the first voltage value, the second control circuit is in ON-state, and the third transmission port is electrically connected to the fourth transmission port, when the setting signal has the second voltage value, the second control circuit is in OFF-state, and third transmission port is electrically disconnected from the fourth transmission port.

6. The display system of claim 3, wherein the HDMI dongle further comprises a second signal receiving module, the second signal receiving module is electrically connected to the second control module, receives a second control signal from the external control device, and converts the second control signal to a second secondary control signal.

7. The display system of claim 3, wherein the HDMI dongle further comprises a power supply circuit, the power supply circuit comprises a protection element and a second DC-DC conversion circuit, the protection element is electrically connected between the second secondary transmission pin and the second DC-DC conversion circuit, and prevents voltage from the second DC-DC conversion circuit from being transmitted in reverse to the second secondary transmission pin, the second DC-DC conversion circuit is electrically connected to the second control module, converts the power supply signal, and transmits the converted power supply signal to the second control module.

8. The display system of claim 7, wherein HDMI dongle further comprises a back-up power supply, the back-up power supply is electrically connected to the second DC-DC conversion circuit, and provides a power supply signal to the second control module when the second secondary transmission pin does not provide the power supply signal.

9. The display system of claim 1, wherein the first adapter circuit comprises a first resistance and a first voltage port, an end of the first resistance is connected to the first primary transmission pin, an opposite end of the first resistance is connected to the first voltage port, the first voltage port has a fifth voltage value; the second adapter circuit comprises a second resistance, an end of the second resistance is connected to ground, an opposite end of the second resistance is connected to the first secondary transmission pin.

10. The display system of claim 1, wherein when the HDMI dongle does not match the display device, the second primary transmission pin detects a connecting state of the first transmission interface, when the first transmission interface is connected, the second primary transmission pin outputs a voltage of 5V, when the first transmission interface is not connected, the second primary transmission pin floats and outputs a detecting result to the first control module.

11. A display device comprising:
a first HDMI transmission interface;
a first control module; and
a first adapter circuit;
wherein the first HDMI transmission interface is electrically connected to the display device, and comprises a plurality of transmission pins, the plurality of transmission pins comprises a first primary transmission pin and a second primary transmission pin;
the first adapter circuit is electrically connected to and provides voltage to the first primary transmission pin, the voltage of the first primary transmission pin represents a matching state between an HDMI dongle and the display device;
the first control module detects the voltage of the first primary transmission pin to obtain the matching state, and outputs an enabling signal accordingly;
the power supply module is electrically connected to the second primary transmission pin and provides a power supply signal, when the HDMI dongle matches the display device, the enabling signal controls the power supply module to transmit the power supply signal to the second primary transmission pin; when the HDMI dongle does not match the display device, the enabling signal prevents the power supply module from transmitting the power supply signal to the second primary transmission pin;
wherein the first primary transmission pin has a first voltage value when the HDMI dongle matches the display device, and the first primary transmission pin has the second voltage value when the HDMI dongle does not match the display device; the enabling signal has a third voltage value when the HDMI dongle matches the display device, and has a fourth voltage value when the HDMI dongle does not match the display device.

12. The display device of claim 11, further comprising a first control circuit and a first signal receiving module, wherein the first transmission interface further comprises a third primary transmission pin, the first signal receiving module is electrically connected to the first control circuit and the first control module, receives a first control signal from an external device, converts the first control signal to a first primary control signal which is configured to control the display device and the HDMI dongle to work, the first control circuit is electrically connected to the second primary transmission pin and the first control module, and is controlled by the enabling signal, when the HDMI dongle matches the display device, the first control circuit transmits the first primary control signal to the third primary transmission pin, when the HDMI dongle does not match the display device, the first control circuit does not transmit the first primary control signal to the third primary transmission pin.

13. The display device of claim 12, wherein the power supply module comprises a first DC-DC conversion circuit and a power supply control circuit, the first DC-DC conversion circuit outputs the power supply signal, the power supply control circuit is electrically connected to the first DC-DC conversion circuit and the second primary transmission pin, the power supply control circuit selectively connect or disconnect the first DC-DC conversion circuit to the second primary transmission pin under a control of the enabling signal, when the HDMI dongle matches the display device, the power supply control circuit controls the first DC-DC conversion circuit to electrically connect to the second primary transmission pin, thereby allowing the power supply signal to be transmitted to the second primary transmission pin, when the HDMI dongle does not match the display device, the power supply control circuit controls the first DC-DC conversion circuit to electrically disconnect from the second primary transmission pin, and does not transmit the power supply signal to the second primary transmission pin.

14. The display device of claim 13, wherein the first control circuit comprises a first enabling port, a first transmission port, and a second transmission port, the first enabling port receives the enabling signal, the first transmission port is electrically connected to the first signal receiving module, the second transmission port is electrically connected to the third primary transmission pin, when the HDMI dongle matches the display device, the first control circuit is in an ON-state which causes first transmission port to electrically connect to and the second transmission port, when the HDMI dongle does not match the display device, the first control circuit is in an OFF-state which causes first transmission port to be electrically disconnected from the second transmission port.

15. The display device of claim 11, wherein the first adapter circuit comprises a first resistance, an end of the first resistance is connected to the first primary transmission pin, an opposite end of the first resistance is connected to the first voltage port, the first voltage port has a fifth voltage value.

16. The display device of claim 15, wherein when the HDMI dongle does not match the display device, the second primary transmission pin detects a connecting state of the first transmission interface, when the first transmission interface is connected, the second primary transmission pin outputs a voltage of 5V, when the first transmission interface is not connected, the second primary transmission pin floats and outputs a detecting result to the first control module.

17. An HDMI dongle comprising:
an HDMI transmission interface;
a control module; and
an adapter circuit;
wherein the HDMI transmission interface is electrically connected to a display device, and comprises a plurality of transmission pins, the plurality of transmission pins comprises a first secondary transmission pin, a second secondary transmission pin, and a third secondary transmission pin;
the adapter circuit is electrically connected to the first secondary transmission pin and provides the voltage to the first secondary transmission pin, the voltage of the first secondary transmission pin represents a matching state between the HDMI dongle and the display device; the control module is electrically connected to the second secondary transmission pin and the third secondary transmission pin, when the HDMI dongle matches the display device, the control module receives a power supply signal from the second secondary transmission pin, the power supply signal is configured to supply power to the control module, the control module further receives a first primary control signal from the display device through the third secondary transmission pin, and transmits display data to the display device according to the first primary control signal.

18. The HDMI dongle of claim 17, further comprising a control circuit, wherein the control circuit is electrically connected between the third secondary transmission pin and the control module, and is further electrically connected to the first secondary transmission pin, a voltage of the first secondary transmission pin function as a setting signal which is transmitted to the control circuit, the control circuit selectively controls the third secondary transmission pin to electrically connect to or disconnect from the control module according to the setting signal; the control circuit comprises a second enabling port, a third transmission port, and a fourth transmission port, the second enabling port is electrically connected to the first secondary transmission pin, the third transmission port is electrically connected to the third secondary transmission pin, the fourth transmission port is electrically connected to the control module; when the setting signal has the first voltage value, the second control circuit is in ON-state, and the third transmission port is electrically connected to the fourth transmission port, when the setting signal has the second voltage value, the second control circuit is in OFF-state, and third transmission port is electrically disconnected from the fourth transmission port.

* * * * *